2 Sheets--Sheet 1.

B. PAYNE.

Machine for Necking Cartridge-Cases.

No. 6,520. Reissued June 29, 1875.

Witnesses.

E. S. Hyde
M. M. Reynolds

Inventor

Brigham Payne
By his Attorney
S W Wood

THE GRAPHIC CO. PHOTO-LITH. 39 & 41 PARK PLACE, N.Y.

2 Sheets--Sheet 2.

B. PAYNE.

Machine for Necking Cartridge-Cases.

No. 6,520. Reissued June 29, 1875.

Witnesses.
E. S. Hyde
W. P. Ruy Nobles

Inventor.
Brigham Payne
By his Attorney
S. W. Wood

THE GRAPHIC CO. PHOTO-LITH. 39 & 41 PARK PLACE, N.Y.

UNITED STATES PATENT OFFICE.

BRIGHAM PAYNE, OF HARTFORD, CONNECTICUT, ASSIGNOR TO J. R. SCHUYLER, M. HARTLEY, AND M. GRAHAM.

IMPROVEMENT IN MACHINES FOR NECKING CARTRIDGE-CASES.

Specification forming part of Letters Patent No. 50,489, dated October 17, 1865; reissue No. 3,793, dated January 11, 1870; reissue No. 6,520, dated June 29, 1875; application filed September 4, 1872.

DIVISION A.

*To all whom it may concern:*

Be it known that I, BRIGHAM PAYNE, of Hartford, in the county of Hartford and State of Connecticut, have invented a new Machine for Swaging Cartridge Cases or Shells; and I do hereby declare that the following is a full, clear, and exact description thereof, which will enable others skilled in the art to make and use the same, reference being had to the accompanying drawings making part of this specification.

It is quite desirable, in the use of metallic cartridges, so called, that their capacity for containing the charge of powder shall be of the greatest possible amount consistent with the bore of the fire-arm in which they are to be used; and with this object in view, the extreme rear portion of the breech has been slightly enlarged, so as to admit a cartridge of somewhat larger diameter than the bore of the gun, the front portion of the case, or that embracing the bullet, however, being of the same diameter as and closely fitting the bore. This operation upon the case, in order to impart the necessary form thereto, is called "necking" or "swaging;" and the present invention relates to a machine for this purpose, it consisting of a novel arrangement of a swaging-die, to the movement of which, at the proper time, the cases or shells are submitted in a manner and by means and devices to be hereinafter described, reference being had to the accompanying drawings, in which—

Figure 1:
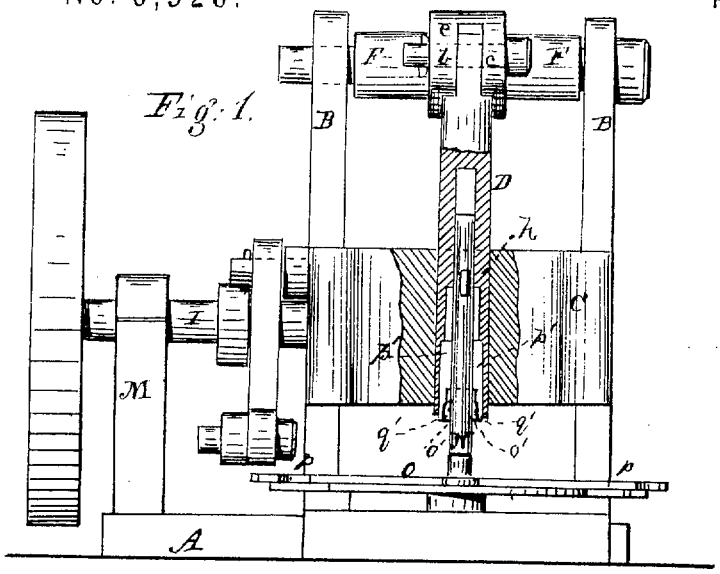
Figure 2:
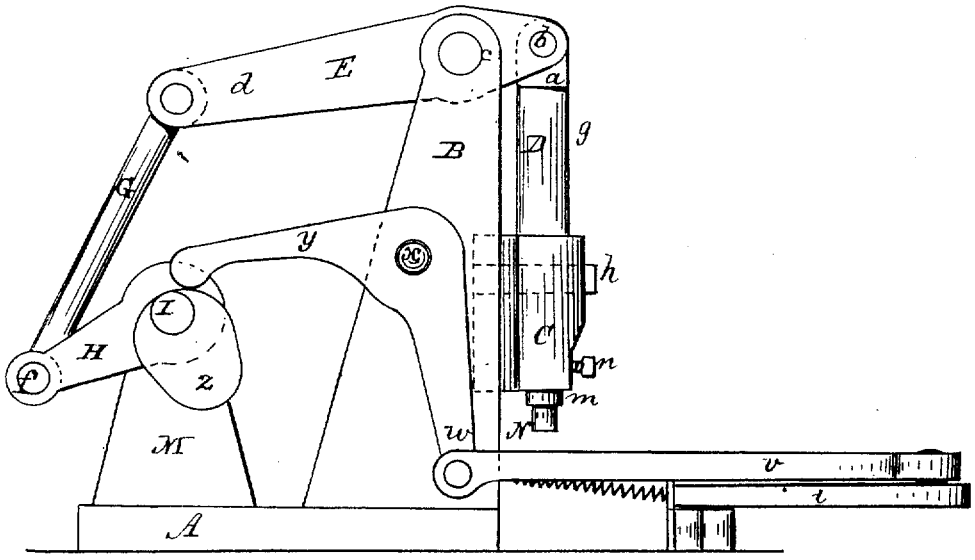
Figure 3:
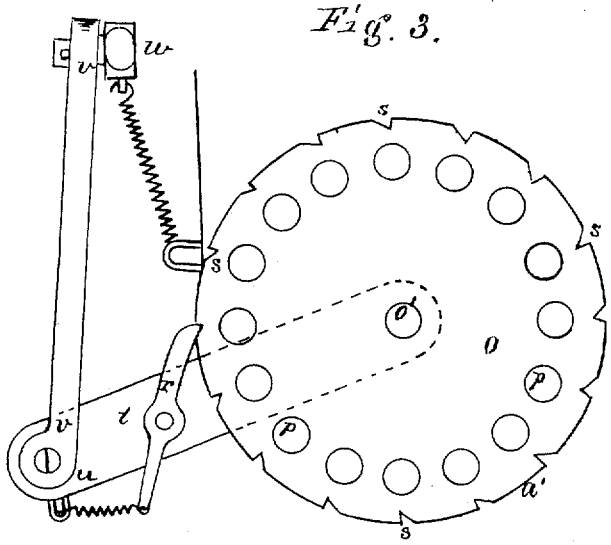
Figures 4, 5:
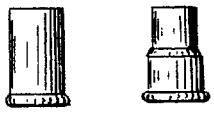

Figure 1 is an end view, Fig. 2 a side view, Fig. 3 a detail view. Figs. 4 and 5, respectively, show a metallic cartridge case or shell previous to and after being operated upon by my improved machine.

A A in the drawings represent the bed-plate of the machine, having two parallel uprights or standards, B B, in and between the upper ends of which, by trunnions F F, is hung a horizontal lever, E, connected by its longer arm *d* through a connecting-rod, G, with the outer end *f* of a crank-arm, H, of the driving-shaft I, to the shorter arm *c* of which is hung, by a pivot, *b*, a vertical hollow arbor, D, moving in a fixed cross-bar, C, of the standards B B; N, a concentric shaft, placed within the interior of the hollow arbor, and fixed or held in position by means of a key-pin, *h*, the said shaft being of such size as to allow the arbor to freely play up and down upon it, the key-pin serving as a guide to its movements through the vertical slot *g* of the same. In the lower end of the hollow arbor, the swaging-die *m*, made of a form to be hereinafter explained, is placed and secured at the proper position by means of a set-screw, *n*, of the arbor. A feed-plate, made of a circular form, and placed in a horizontal position below the swaging-die, turns upon a center-pin, *o'*, when actuated by an arrangement of devices to be presently described. This plate O has a series of apertures, *p p p p*, formed around it, and in one and the same circle, at equal distances apart, corresponding in shape to the cap or fulminating end of the cartridges cases or shells, and in which they are placed and fed along to the swaging-die, as before referred to, the said apertures being brought, in turn and regular succession, at the proper times in the same vertical plane as that of the die, and there held, during its downward movement, by means of a spring-pawl, *r*, engaging with its teeth *s s*, and hung upon a swinging arm, *t*, of the center-pin *o'* of the feed-plate, which arm, at its outer end *u*, is connected by a rod, *v*, with one arm, *w*, of an angular lever placed in a vertical position, and turning upon a fulcrum-pin, *x*, of the standard B, the other arm, *y*, bearing and resting upon a fixed cam-wheel, *z*, of the driving-shaft I, and revolving with it.

By revolving the driving-shaft in the proper direction, the vertical hollow arbor D has imparted to it, through the devices hereinbefore described as connecting it with said shaft, an up-and-down movement in a vertical plane, while at the same time the feed-plate is intermittently revolved in a horizontal plane, through its devices connecting it with the same shaft, the periphery of the cam by which the actuating devices of the feed-plate receive their motion being of the proper form to impart to the feed-plate at the time when the

BEST AVAILABLE COPY swaging-die is in its upward movement the necessary length of rotation to feed the case or shell occupying its next aperture to the swaging-die, and there holding until its downward movement has taken place, and so on, as long as may be deemed desirable, the cases still passing around to the point $a'$ of the bed-plate, where they finally drop from the machine.

The swaging-die $m$ is made of the shape upon its interior represented in section in Fig. 1, and is of a little greater diameter at its lower portion $o'$ than at its upper $q'$, but connected together by a gradual incline, $q'$, the lower $o'$ coinciding with the full size of the shell or case, while the latter is of such a size as to impart to the case the necessary diameter to nicely fit the bore of the fire-arm in which the cartridge is to be used, as it is brought down upon the case fed to it, as described, and as is obvious without further explanation.

In case the shell, after having been swaged, as described, should "hang" upon the die in its upward movement, it will be instantly disconnected therefrom by abutting against the lower end of the shaft N, and thus thrown back upon the feed-plate to be removed thereby as it revolves, the said shaft being arranged in such position, with reference to the feed-plate, as to freely allow the cases to pass under it into position for the swaging-die.

It is obvious that in all cases the cartridge-shell must be made to conform to the shape or configuration of the chamber of the gun in which it is to be used, and as these are numerous and varied, it will be necessary in swaging shells for different guns to change the hollow die $o$ to correspond with the chamber of the gun for which the shell is to be fitted, and the die $m$ is made detachable for that purpose.

Having thus fully described my improved machinery for "necking" metallic cases for cartridges, what I claim therein as new, and desire to secure by Letters Patent, is—

1. The reciprocating plunger D, provided with the tubular die $m$, said die having its interior so formed as to permit the shell to protrude up into it as the latter is compressed, as herein set forth.

2. The combination of the tubular die $m$ and the shaft N, when constructed and arranged to operate substantially as herein described, or in a manner equivalent thereto.

3. The combination of a compressing-die, expelling-shaft, and a rotating or carrying disk, constructed and arranged to operate substantially as and for the purpose herein specified.

BRIGHAM PAYNE.

Witnesses:
EDMOND E. MARVIN,
LOREN P. WALDO.